US006894553B2

(12) United States Patent
Hulfachor et al.

(10) Patent No.: US 6,894,553 B2
(45) Date of Patent: May 17, 2005

(54) CAPACITIVELY COUPLED CURRENT BOOST CIRCUITRY FOR INTEGRATED VOLTAGE REGULATOR

(75) Inventors: Ronald B. Hulfachor, Cape Elizabeth, ME (US); James J. McDonald, II., Gorham, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 67 days.

(21) Appl. No.: 10/208,951

(22) Filed: Jul. 31, 2002

(65) Prior Publication Data

US 2004/0021503 A1 Feb. 5, 2004

(51) Int. Cl.[7] ............................ G05F 1/40; H02M 3/24
(52) U.S. Cl. ....................................... 327/536; 323/276
(58) Field of Search ................................ 327/536, 537, 327/542, 390; 323/280, 273, 276

(56) References Cited

U.S. PATENT DOCUMENTS 5,850,139 A * 12/1998 Edwards ..................... 323/280
6,188,211 B1 * 2/2001 Rincon-Mora et al. ..... 323/280
6,388,506 B1 * 5/2002 Voo ............................ 327/536
6,661,212 B2 * 12/2003 Ostrom ....................... 323/276

* cited by examiner

*Primary Examiner*—Dinh T. Le
(74) *Attorney, Agent, or Firm*—Cesari and McKenna, LLP; Edwin H. Paul, Esq.

(57) ABSTRACT

A current boost circuit that supplies additional current to a voltage reference power rail. When the voltage reference power rail drops due to an excessive current demand from the load, the drop is sensed and a switch is activated supplying additional current to the voltage reference rail. A gain stage is capacitively coupled to the reference voltage and any drop is transferred through this capacitor to a gain stage that amplifies the drop. The amplified drop is capacitively coupled to a solid state switch that turns on connecting an additional current source to the reference voltage rail. The solid state switch is biased just below its turn on threshold.

6 Claims, 2 Drawing Sheets

CAPACITIVELY COUPLED CURRENT BOOST CIRCUITRY FOR INTEGRATED VOLTAGE REGULATOR

BACKGROUND OF THE INVENTION

1. Field of the Invention

The present invention relates to voltage regulators, and more particularly to integrated circuit voltage regulators and even more particularly to their response to quickly changing load impedances requiring large, instantaneous, additional load current.

2. Background Information

Voltage regulators are designed to provide a constant DC voltage output, Vref, and are used extensively in integrated circuitry. One operational issue arises in many applications using voltage regulators where a particular circumstance of logic signals or a logic state requires an unusual number of logic circuits or gates to switch in nearly perfect unison. This problem occurs most often in clocked synchronous systems—the type that predominates in logic designs. Typically in such designs, all the logic circuits will switch to or remain in a state in response to a clock edge transition. If all or many gates switch, for example, from a low to a high logic state, the drive transistors, connecting the +Vref to the gate outputs, turn on in unison and drive the output load, especially the load capacitance, high. This load capacitance may be large and the transient current needed to charge this capacitance quickly to a logic high will demand a high transient current from the Vref voltage regulator. There is an impedance of the physical layout and connections between the regulator output and the +Vref rail at the logic circuits, but for this discussion it is not considered because this impedance is typically small and not a major factor in the droop on the +Vref. In any event, the high current quickly demanded by the load manifests as a droop or ripple on the voltage output from the regulator.

Many approaches have been devised to limit this droop. Probably the simplest is a large capacitor (a filter capacitance) on the voltage regulator to supply some of the transient current. But more effective attempts have been made. One such attempt is found in U.S. Pat. No. 5,945,818 by Edwards. In this patent a variable pole/zero configuration is described that provide stability but allowing quick transient response recovery and reduced droop. Another approach is found in U.S. Pat. No. 6,320,363 owned by Motorola, Inc. In this approach dual operational amplifiers are used with differing transient responses that reduce transient voltage droops. Yet another approach is found in U.S. Pat. No. 313,615 owned by Intel Corp. where AC interference is filtered from the DC output to a PLL (phase locked loop).

One issue that must be addressed in any of these designs is the phase margin of the design. Phase margin is the susceptibility or lack of susceptibility of the voltage regulator becoming unstable with projected variable load impedances. Obviously, the regulator must be stable but at the same time respond quickly to changing loads.

There remains a need for a stable voltage regulator that quickly provide fast transient currents with small voltage droops and with sufficient phase margin. Moreover, where space is a premium, for example on the chip, the chip real estate becomes a design issue.

SUMMARY OF THE INVENTION

In view of the foregoing background discussion, the present invention provides an output load current boost that is coupled to the voltage regulator output and any load thereon. A large solid state switch defines a control terminal and first and second terminals, preferably a MOSFET transistor. The solid state switch control terminal is biased near its threshold with a gain stage driving it. When the regulator voltage output drops, that drop is connected to and amplified by the gain stage which, in turn, drives the control terminal of the switch turning it on. When the switch is on, the first and second terminals are shorted to each other, thereby connecting a current source to the load and provides the instantaneous output current that thereby reduces the voltage drop.

In a preferred embodiment the regulated output voltage drop is capacitively coupled to a gain stage that is capacitively coupled to the gate of a MOSFET switch. The MOSFET switch connects the regulated output voltage to a power source that supplies the additional current demanded by the load. In this embodiment the MOSFET switch is biased near its conducting threshold, so that a very small drop in the regulated voltage will be amplified and drive the MOSFET switch on.

Since power supplies are needed in virtually all computer related electronics systems, the present invention will find advantageous application in displays, memories, communications, client/server and any other computing or electronic system.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
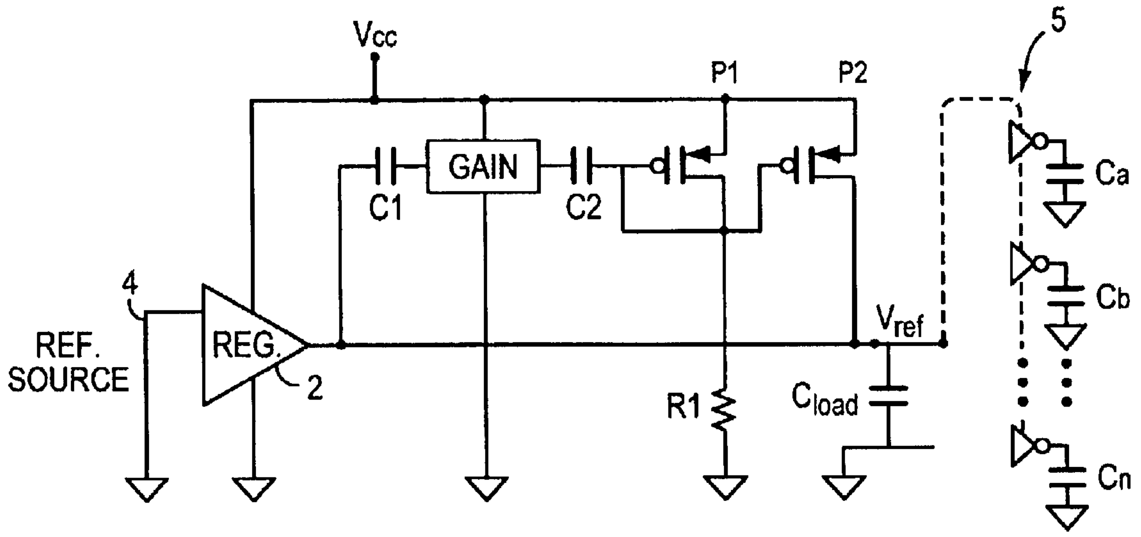
FIG. 1 is a block diagram circuit schematic of one embodiment of the invention.

FIG. 1 shows in a block diagram schematic a basic circuit embodying the present invention. Here a digital logic circuit load is powered from a Vref which may be +3.3 volts or +2.5 volts, or virtually any other voltage for powering logic circuitry.

The regulator 2 is shown generically with some reference from which the Vref output voltage is developed. Design of the regulator is well known by practitioners in the art. As evident Vcc powers the regulator, and the Vref output powers digital logic circuitry. However, the Vref is suitable for powering other circuitry, it is not limited to digital logic. FIG. 1 shows the Vref powering a multitude of generic gates 5, where each gate has a load capacitance, Ca, Cb, to Cn. As described above when all these generic gate outputs are driven high the current to charge the gate load capacitances is drawn from Vref. This transient load current will cause a drop in the local Vref and that action will drawn current from the Cload capacitor. So the Cload supplies the initial transient current.

The Vref drop is coupled through C1 to a gain stage that amplifies the Vref drop. The amplified output is directed through C2 to turn on P1 and P2. When the PMOS transistors are on additional load transient current is supplied from Vcc.

The arrangement of P1 and P2 with a bias resistor R1 to ground maintains the gates of both P1 and P2 near the conduction threshold for each PMOS. When a negative edge appears at C1, it is fed through the gain stage and C2 to the gates of the PMOS transistors. The PMOS transistor P2 turns on immediately supplying current to the Vref rail.

Figure 2:
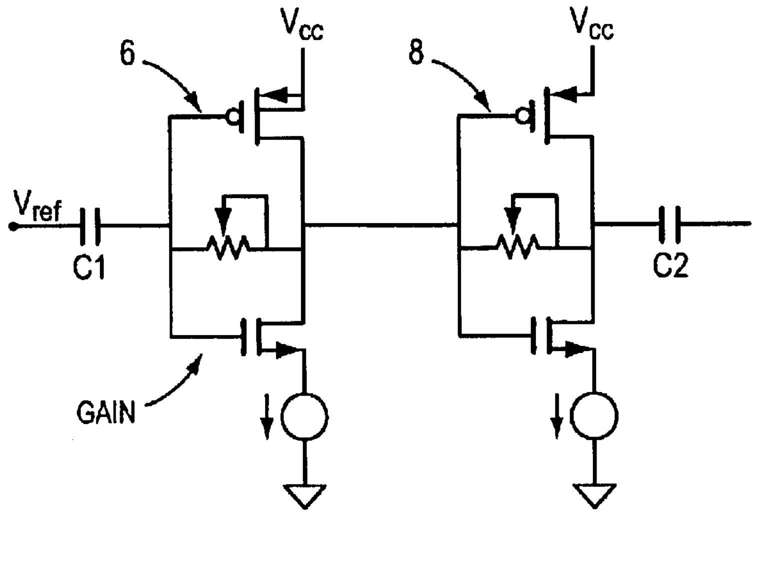
FIG. 2 is a schematic of the gain stage of FIG. 1.

FIG. 2 is a bare circuit schematic of a possible gain circuit. The gain is a non-inverting two stage push/pull or totem pole configuration. There is a first PMOS/NMOS pair 6 that inverts and amplifies the AC signal on the Vref line. The second PMOS/NMOS pair inverts and amplifies that signal. The resulting amplified signal is sent through C2 to P1 and P2 gates. Current sources are shown in the sources of the NMOS transistors and potentiometers are shown gate to drain in the transistors shown. These components represent a biasing scheme for the gain amplifier—other such biasing is well known in the art.

Although the above preferred embodiment use MOSFETS that are capacitively coupled via a gain stage, many other circuit techniques and other solid state circuit components can be used to advantage with the present invention. For example, junction solid state components may replace the MOSFET switches and the circuitry may be directly coupled if the biasing is controlled. So a comparator may be DC biased at a threshold just below the Vref voltage level, such that when the Vref voltage drops to that threshold the comparator amplifies the input and activates the current boost. For example, the comparator may drive a transistor switch that connects a power source that supplies the transient current to the Vref rail. More components may be used with direct coupling, but one of both coupling capacitors may be deleted. Also, with or without some or both coupling capacitors, bipolar components may substitute for one of more of the MOSFETS. Moreover, in any or all of these functionally equivalent circuits, different polarities of components may be used. For example, NMOS replacing PMOS and PNP replacing NPN, etc. In addition the circuitry of FIGS. 1 and 2 show positive Vcc and Vref, but the present invention may be used with negative voltages and combinations of positive and negative, e.g. +5V and −5V. Implementations of the above variations are well known in the art.

Figure 3:
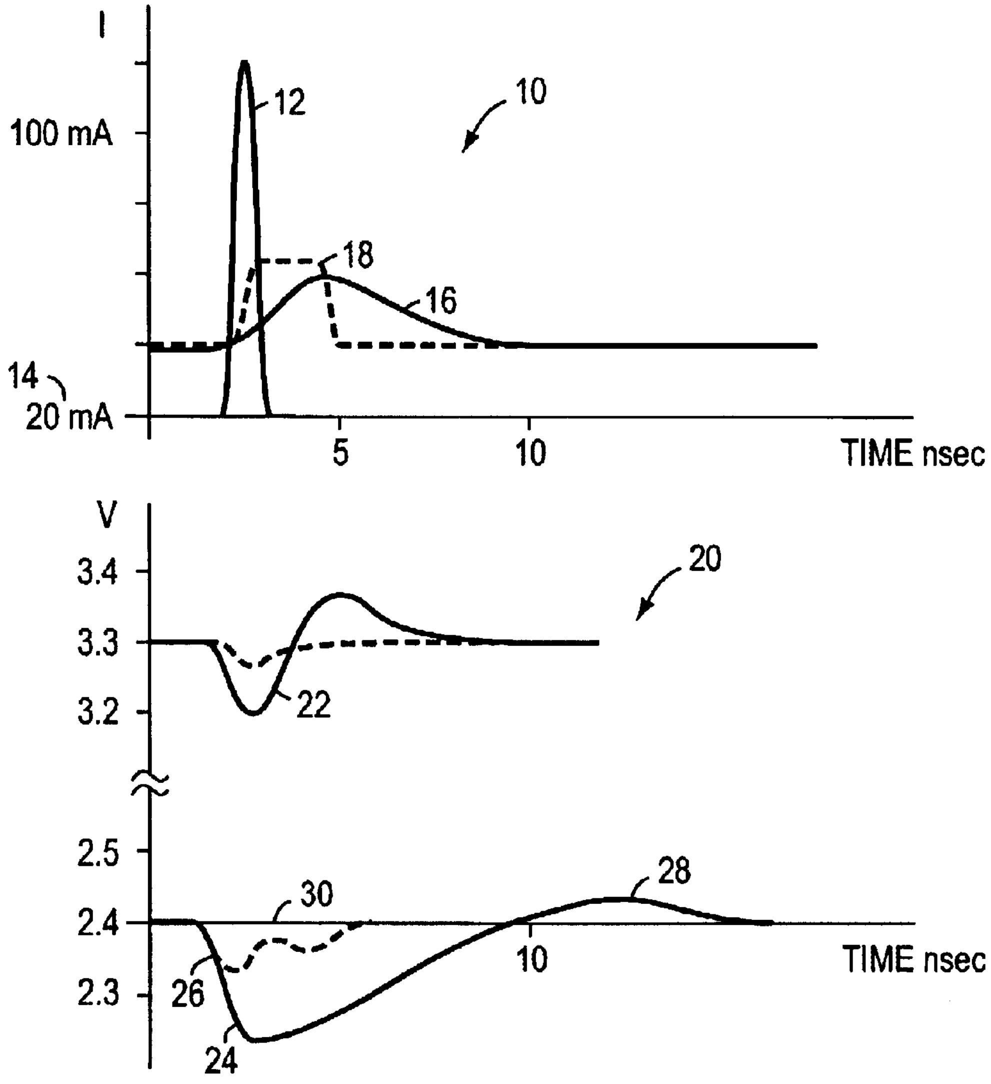
FIG. 3 are graphs of comparative current and voltage waveforms.

FIG. 3 is a set of graphs that illustrate the comparative performance of a standard regulator and a regulator incorporating the present invention. The top graph shows a current impulse 12 of about 100 ma lasting about one nanosecond, say due to a rapid change in load current. This impulse of 100 ma is from the regulator capacitor with the regulator supplying the base 20 ma 14. A standard regulator current response of the regulator to recharge the capacitor due to this impulse is shown 16 and the corresponding current response 18 of the regulator with the current boost of the present invention. It is clear that the capacitance is charged in about 3 nanoseconds with the present invention where it takes about 8 nanoseconds with a standard regulator.

Comparative voltage waveforms are shown in graphs 20. At a regulated output of 3.3 V, the present invention reduces a 100 millivolt drop 22 in output voltage to about 15 millivolts, and the recovery without the present invention takes about 5 nanoseconds compared to about one nanosecond with the present invention. The 2.5 volt output shows a 240 millivolt drop 24 in the standard regulator that is reduced to a 140 millivolt drop 26 using the present invention. The recovery time for the standard regulator is about 8 to 12 milliseconds 28 while it is about 3 milliseconds 30 with the present invention.

Figure 4:
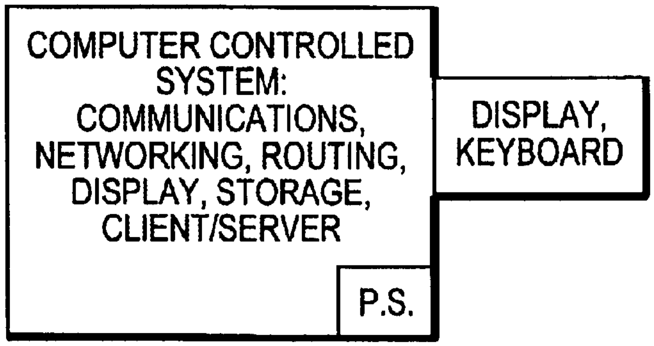
FIG. 4 is a representative computer system incorporating the present invention.

FIG. 4 illustrates that the inventive circuit as applied to a power supply in the electronics assemblies and circuitry of any computing system. In fact the current boost provided by the present invention may be found in the power supplies of virtually any computing and processing electronics and in all the electronics associated with the I/O of each assembly. For example, in communications systems, networking systems, routers, storage systems, client/servers, displays, keyboards, printers, etc. all will benefit from the present inventive current boost invention.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A current boost for a regulated voltage comprising:

an amplifier defining an input and an amplified output, a first capacitor that connects the regulated voltage to the amplifier input, a solid state switch defining a control terminal and first and second terminals, wherein the first terminal is connected to a current source and the second terminal is connected to the regulated voltage, a second capacitor that connects the amplified output to the solid state switch control terminal, wherein the amplified output controls the on and off state of the solid state switch, wherein a voltage drop on the regulated output is amplified and turns on the solid state switch thereby connecting the current source to the regulated output.

2. The current boost as defined in claim 1 wherein the solid state switch is a MOSFET.

3. The current boost as defined in claim 1 further comprising biasing circuitry connected to the control terminal of the solid state switch, wherein the solid state switch is biased at the threshold of turning on.

4. A method providing a current boost for a regulated voltage comprising the steps of:

detecting a voltage drop in the regulated voltage, capacitively connecting the voltage drop to an amplifier, amplifying the voltage drop, capacitively connecting the amplified voltage drop to a control terminal of a solid state switch, wherein the amplified voltage drop turns on the state of solid state switch, and connecting the solid state switch between the regulated voltage and a source of current.

5. The method as defined in claim 4, wherein the solid state switch is a MOSFET.

6. The method as defined in claim 4, further comprising the step of biasing the solid state switch at the threshold of turning on.

* * * * *